(No Model.)

W. P. SHATTUCK.
WEED GUARD FOR FISH HOOKS.

No. 539,149. Patented May 14, 1895.

Witnesses,
Chas. E. Van Doren
Henry B. Avery.

Inventor:
William P. Shattuck.
By Paul & Hawley
his Attorneys.

UNITED STATES PATENT OFFICE.

WILLIAM P. SHATTUCK, OF MINNEAPOLIS, MINNESOTA.

WEED-GUARD FOR FISH-HOOKS.

SPECIFICATION forming part of Letters Patent No. 539,149, dated May 14, 1895.

Application filed February 20, 1894. Serial No. 500,823. (No model.)

*To all whom it may concern:*

Be it known that I, WILLIAM P. SHATTUCK, of the city of Minneapolis, county of Hennepin, State of Minnesota, have invented certain new and useful Improvements in Weed-Guards for Fish-Hooks, of which the following is a specification.

My invention relates to fish hooks and in particular to weed-guards for trolling spoons and other fish-hooks.

The object of my invention is to provide a cheap and easily attached weed guard for fish-hooks of all kinds, which guard, while in no way interfering with the attractiveness of the bait or with fastening a fish, will prevent the accumulation of weeds or grass on the hook.

The particular object is to provide a perfect weed-guard for trolling or spoon hooks. As such hooks generally carry no bait of a size to keep the hook clear, fishermen while trolling are constantly annoyed by having to draw in the line to clear off the hook, a thing of continued occurrence in the shallow weedy lakes which most abound in pickerel and other troll fish.

The invention consists in a device or arm attached to the shank of the hook and flexible in all directions, and adapted to be bent down into engagement with the point of the hook, whereby weeds first strike the arm and are prevented from catching in the hook; and further my invention consists in details of construction and in combinations all as hereinafter described, and particularly pointed out in the claims.

The invention will be more readily understood by reference to the accompanying drawings, forming part of this specification, and in which—

Figure 1:
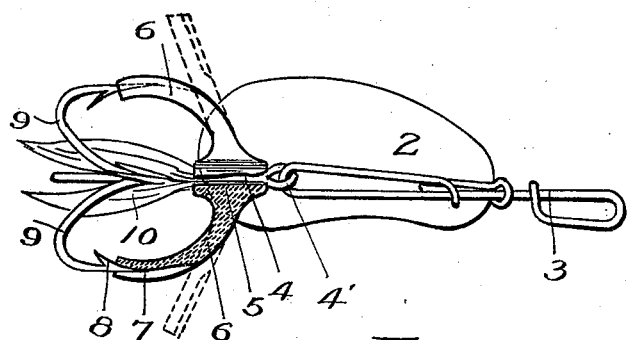
Figure 2:
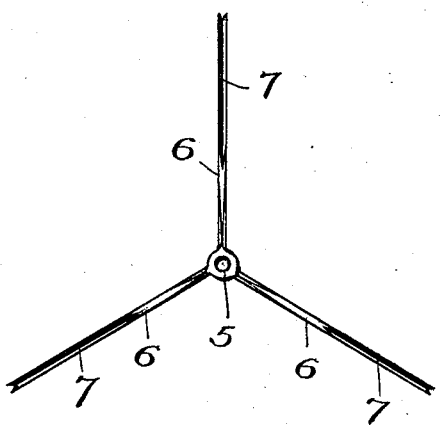
Figure 3:
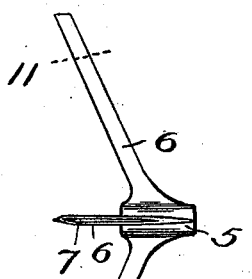

Figure 1 shows a spoon or trolling hook provided with a guard embodying my invention, one arm thereof being shown in section. Fig. 2 is a plan view of a guard in its original form. Fig. 3 is a side view thereof.

In the drawings, I have shown a weed guard adapted for use with a three barbed trolling hook. The construction of the trolling or spoon hook is a common one, 3 representing the spindle and 2 the revoluble spoon. The spindle is attached to the eye 4' in the shank 4 of the hook, from which shank the separate hooks 9 extend, each having a barb 8. The weed guard consists in the sleeve 5 and the three arms 6, each of which is preferably provided on its outer or upper side with a shallow groove 7. The ends of the arms are bent down and caught behind the points of the hooks.

In Figs. 2 and 3, I have shown the guard in its original form and size, the arms thereon being shown considerably longer than those on the hook, Fig. 1, the ends of the arms 6 in practice being cut off to suit, as at the points 11. Shown by dotted lines in Fig. 3. The arm are made long originally in order that the guard may be fitted to different sized hooks.

The guard is preferably made of rubber or like flexible material, having a spring-like quality causing the ends of the arms to remain in place against the points of the hooks after once being adjusted. These arms are flexible in all directions. The upper and lower edges of the arms are preferably drawn down to a fine line in order that the device may have the slightest possible obstruction to the water. The soft yielding arms in a great measure serve as an attractive bait, greatly increasing the chances of hooking a fish if once started.

A hook equipped in this manner may be drawn through the water rapidly and against and through weeds without danger of the weeds catching upon the hooks, as the strength of the arm is sufficient to throw the weeds to one side. Furthermore as the arms curve downward no projection is left for the weeds to catch upon. The strength of the arms is not, however, sufficient to in any way interfere with the hooking of a fish. Even in case an arm slips from the hook it will, while in the position shown by dotted lines in Fig. 1, serve as a very effectual guard.

The arms of the weed-guard being formed of rubber, or other material that is flexible in all directions, will yield in whatever direction pressure is applied to them. This is of great importance, in a device of this kind, as it permits the fish to hook itself no matter in what direction it strikes the yielding arm.

Heretofore it has been proposed to employ spring arms as guards for fish-hooks, said arms being constructed of spring-metal and being capable of yielding in one direction only. This is objectionable, as, when a fish strikes such an arm in any direction except one that is in line with the plane in which the arm yields, the arm forms an obstruction to the engagement of the fish with the hook. As in my device the arms are capable of yielding in all directions there is no tendency to keep the fish from engaging the hook. Moreover my device can be readily applied to any hook and will be held in position by the elastic sleeve that engages the shank of the hook. Again, as the arms yield in all directions, there is no possibility of their being broken by the floundering of the fish. Again, as the arms are soft and pliable, they bear considerable resemblance to frogs' legs, or other material, often used as bait. As the arms of the guard are narrow, they permit the water to flow or pass freely between the arms and thus do not interfere or change the working of the spoon as would be the case if much of an eddy were created below the spoon by the drawing of the hook and guard through the water.

My improved guard may be made and sold separately and applied by any fisherman to any hook with which he may desire to use it.

The arm may be cut off at the proper length to fit it to the desired hook and the device may, at will, be removed from one hook and applied to another.

It is obvious that a single armed weed-guard may be provided for single hooks such as are used in casting, which hooks are often drawn rapidly through the water by means of a reel.

It is further obvious that the form of the guard and means of attachment to the shank of the hook, and other features may be considerably altered without departing from the spirit of my invention, and I therefore do not confine the same to the specific construction herein shown and described.

Having thus described my invention, I claim as new and desire to secure by Letters Patent—

1. The combination, with a fish hook, of a sleeve arranged to engage the shank of the hook, and a series of rubber arms secured upon said sleeve and adapted to extend to and protect the points of the hooks, said arms being flexible in all directions, for the purpose set forth.

2. The combination, with a fish-hook, of an elastic sleeve arranged to engage the shank of the hook and an arm, flexible in all directions, connected with said sleeve and adapted to extend to and protect the point of the hook, substantially as described.

3. The combination, with a fish-hook, having a barb, of the flexible rubber arms supported upon the shank of the hook and arranged above said barb, and the edges of said arms being sharp for the purpose of cutting the water, substantially as described and for the purpose specified.

4. As a new article of manufacture, a weed-guard for fish-hooks comprising an elastic sleeve adapted to be placed upon the shank of the hook and having connected therewith one or more arms flexible in all directions, for the purpose specified.

5. As a new article of manufacture, the herein-described weed-guard consisting of the rubber-sleeve 5, and the rubber arms 6 connected therewith and provided with grooves 7 in their outer edges.

In testimony whereof I have hereunto set my hand this 12th day of February, A. D. 1894.

WILLIAM P. SHATTUCK.

In presence of—
C. G. HAWLEY,
M. E. GOOLEY.